US008897521B2
US 8,897,521 B2
Nov. 25, 2014

(12) United States Patent
Lu et al.

(54) ULTRASOUND IMAGE REGISTRATION APPARATUS AND METHOD THEREOF

(75) Inventors: Wei-Cheng Lu, Chiayi (TW); Guo-Zua Wu, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 477 days.

(21) Appl. No.: 13/304,316

(22) Filed: Nov. 24, 2011

(65) Prior Publication Data

US 2013/0044929 A1 Feb. 21, 2013

(30) Foreign Application Priority Data

Aug. 19, 2011 (TW) .............................. 100129768 A

(51) Int. Cl.
- G06K 9/00 (2006.01)
- G06K 9/32 (2006.01)
- A61B 8/00 (2006.01)
- G06T 7/00 (2006.01)

(52) U.S. Cl.
CPC ..... G06T 7/0028 (2013.01); G06T 2207/10132 (2013.01); G06T 2207/30004 (2013.01)
USPC ............................. 382/128; 382/294; 600/443

(58) Field of Classification Search
None
See application file for complete search history.

(56) References Cited

U.S. PATENT DOCUMENTS

| | | | | |
|---|---|---|---|---|
| 5,575,286 A | * | 11/1996 | Weng et al. | 600/444 |
| 5,655,535 A | * | 8/1997 | Friemel et al. | 600/443 |
| 5,793,883 A | * | 8/1998 | Kim et al. | 382/128 |
| 5,839,440 A | * | 11/1998 | Liou et al. | 600/431 |
| 5,899,861 A | * | 5/1999 | Friemel et al. | 600/443 |
| 6,014,473 A | * | 1/2000 | Hossack et al. | 382/294 |
| 6,017,309 A | * | 1/2000 | Washburn et al. | 600/454 |
| 6,139,498 A | * | 10/2000 | Katsman et al. | 600/443 |
| 6,159,152 A | * | 12/2000 | Sumanaweera et al. | 600/443 |
| 6,222,948 B1 | | 4/2001 | Hossack et al. | |
| 6,238,345 B1 | * | 5/2001 | Wissler et al. | 600/443 |
| 6,283,917 B1 | * | 9/2001 | Jago et al. | 600/437 |
| 6,373,970 B1 | | 4/2002 | Dong et al. | |
| 6,416,477 B1 | * | 7/2002 | Jago | 600/447 |
| 6,423,004 B1 | * | 7/2002 | Dong et al. | 600/443 |
| 6,442,289 B1 | * | 8/2002 | Olsson et al. | 382/128 |

(Continued)

OTHER PUBLICATIONS

Krucker et al., "Rapid Elastic Image Registration for 3-D Ultrasound", IEEE Transactions on Medical Imaging, vol. 21, No. 11, Nov. 11, 2002, pp. 1384-1394.

(Continued)

Primary Examiner — Wenpeng Chen
(74) Attorney, Agent, or Firm — Jianq Chyun IP Office

(57) ABSTRACT

The disclosure provides an ultrasound image registration apparatus and a method thereof suitable for registering two ultrasound images partially overlapped with each other. The apparatus comprises: a first-stage image-developing processing module, a second-stage image-developing processing module and a registration module. The first-stage image-developing processing module performs beam-forming processing on two ultrasound images so as to generate two raw images. The second-stage image-developing processing module connects the first-stage module for performing envelope detection processing and compression processing on the raw images so as to generate two developed ultrasound images. The registration module connects the two image-developing processing modules for respectively obtaining coordinate information of at least one feature point of the raw images as the initial values of an image registration procedure, and for performing speckles-reducing processing on the developed ultrasound images and using the speckles-reduced ultrasound images to perform the image registration procedure.

17 Claims, 12 Drawing Sheets

(56) References Cited

U.S. PATENT DOCUMENTS

| | | | |
|---|---|---|---|
| 6,554,770 B1* | 4/2003 | Sumanaweera et al. | 600/443 |
| 6,605,042 B2* | 8/2003 | Dong et al. | 600/447 |
| 6,824,514 B2* | 11/2004 | Poland et al. | 600/437 |
| 7,074,187 B2* | 7/2006 | Selzer et al. | 600/440 |
| 7,713,205 B2* | 5/2010 | Fu et al. | 600/443 |
| 7,833,159 B2* | 11/2010 | Ahn et al. | 600/437 |
| 7,837,624 B1* | 11/2010 | Hossack et al. | 600/443 |
| 7,856,130 B2* | 12/2010 | Suri et al. | 382/128 |
| 8,057,394 B2* | 11/2011 | Dala-Krishna | 600/466 |
| 8,303,505 B2* | 11/2012 | Webler et al. | 600/447 |
| 8,428,318 B2* | 4/2013 | Zhuo et al. | 382/128 |
| 8,622,915 B2* | 1/2014 | Dala-Krishna | 600/466 |
| 8,647,276 B2* | 2/2014 | Tabaru et al. | 600/449 |
| 2002/0120195 A1* | 8/2002 | Hossack et al. | 600/443 |
| 2003/0097068 A1* | 5/2003 | Hossack et al. | 600/443 |
| 2005/0049477 A1* | 3/2005 | Fu et al. | 600/407 |
| 2005/0096544 A1* | 5/2005 | Hao et al. | 600/447 |
| 2005/0113695 A1* | 5/2005 | Miller | 600/443 |
| 2006/0004275 A1 | 1/2006 | Vija et al. | |
| 2007/0015991 A1* | 1/2007 | Fu et al. | 600/407 |
| 2007/0036408 A1* | 2/2007 | Kim et al. | 382/128 |
| 2007/0083114 A1* | 4/2007 | Yang et al. | 600/437 |
| 2007/0165925 A1* | 7/2007 | Ahn et al. | 382/128 |
| 2008/0025619 A1* | 1/2008 | Lankoande et al. | 382/232 |
| 2008/0049994 A1* | 2/2008 | Rognin et al. | 382/128 |
| 2009/0005679 A1* | 1/2009 | Dala-Krishna | 600/437 |
| 2009/0028406 A1* | 1/2009 | Arditi et al. | 382/131 |
| 2009/0129651 A1* | 5/2009 | Zagzebski et al. | 382/131 |
| 2009/0175557 A1* | 7/2009 | Lankoande et al. | 382/275 |
| 2009/0209858 A1* | 8/2009 | Oelze | 600/443 |
| 2009/0304252 A1 | 12/2009 | Hyun et al. | |
| 2009/0306507 A1 | 12/2009 | Hyun et al. | |
| 2010/0004540 A1* | 1/2010 | Thiele | 600/447 |
| 2010/0135599 A1 | 6/2010 | Lee | |
| 2010/0142778 A1* | 6/2010 | Zhuo et al. | 382/128 |
| 2010/0183196 A1* | 7/2010 | Fu et al. | 382/103 |
| 2010/0185093 A1* | 7/2010 | Hamilton | 600/443 |
| 2011/0026796 A1 | 2/2011 | Hyun et al. | |
| 2011/0028843 A1 | 2/2011 | Hyun et al. | |
| 2011/0160589 A1* | 6/2011 | Fu et al. | 600/443 |
| 2012/0020530 A1* | 1/2012 | Yu et al. | 382/107 |
| 2012/0113108 A1* | 5/2012 | Dala-Krishna | 345/419 |
| 2012/0136250 A1* | 5/2012 | Tabaru et al. | 600/438 |

OTHER PUBLICATIONS

Krucker et al., "Rapid Image Registration for 3D Ultrasound Compounding", IEEE Ultrasound Symposium, vol. 2, Jun. 21, 2000, pp. 1585-1588.

Lee et al., "Non-rigid registration between 3D ultrasound and CT images of the liver based on intensity and gradient information", Physics in Medicine and Biology, vol. 56, Nov. 30, 2011, pp. 117-137.

Maintz et al., "A Survey of Medical Image Registration", Oxford University Press, vol. 2, Oct. 16, 1997, pp. 1-37.

Francois et al., "Robust statistical registration of 3D ultrasound images using texture information," Proceedings of 2003 International Conference on Image Processing, Sep. 14-17, 2003, pp. 1-4.

"Notice of Allowance of Taiwan Counterpart Application", issued on May 13, 2014, p. 1-p. 4.

* cited by examiner

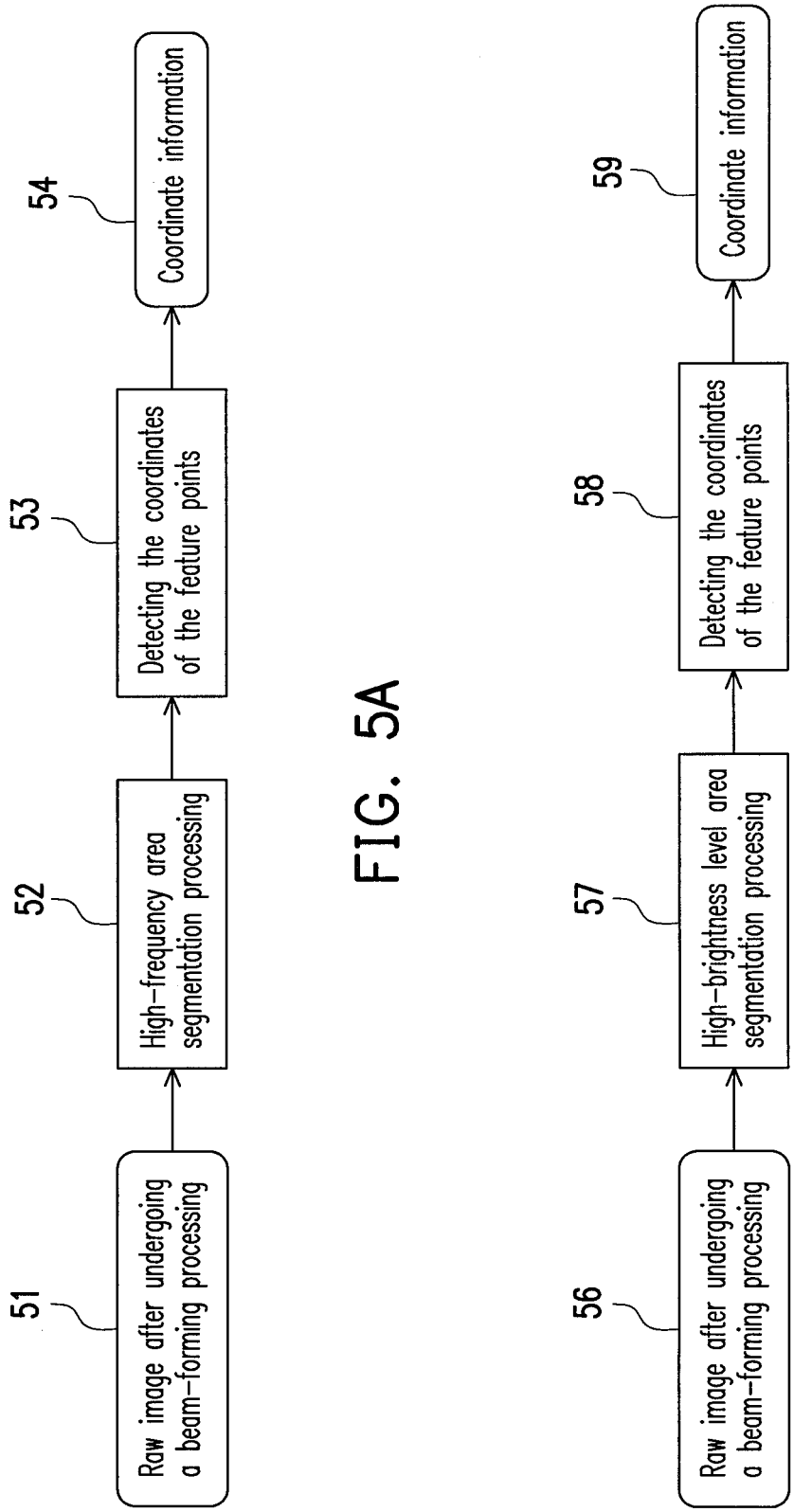

ULTRASOUND IMAGE REGISTRATION APPARATUS AND METHOD THEREOF

CROSS-REFERENCE TO RELATED APPLICATION

This application claims the priority benefit of Taiwan application serial no. 100129768, filed on Aug. 19, 2011. The entirety of the above-mentioned patent application is hereby incorporated by reference herein and made a part of this specification.

BACKGROUND

1. Technical Field

The disclosure generally relates to an ultrasound image registration apparatus and a method thereof, which are able to register two ultrasound images partially overlapped with each other.

2. Related Art

In medical image applications, the image registration processing (or image alignment processing between two images) plays an important role, for example, it is needed by image fusion or three-dimensional computed tomography (CT) serving as a first-stage image processing. When dealing with an image registration of ultrasound B-mode images, it is found that a basic characteristic of the ultrasound image, i.e. speckles in an ultrasound image, makes the image registration difficult for processing. The speckles make it difficult for the optimization step in an image registration processing architecture to achieve global optima, instead, only local optima can be found.

The early image registration processing technique is mainly used to register images obtained through different image-capturing methods (including different detectors), where the images are developed first, and then, an image registration processing is performed. However, if an image registration processing starts only after image-developing operation is complete, a lot of raw data may be lost in the image-developing operation of ultrasound images; moreover, the image dynamic range would be reduced, and thereby increase the impact of noise on the image quality. Therefore, how to improve the accuracy and the processing efficiency of image registration processing has become a major issue for the industry.

SUMMARY

The disclosure provides exemplary embodiments of an ultrasound image registration apparatus. According to an exemplary embodiment of the disclosure, the ultrasound image registration apparatus is suitable for registering two ultrasound images partially overlapped with each other and comprises: a first-stage image-developing processing module, a second-stage image-developing processing module and a registration module. The first-stage image-developing processing module is configured for performing beam-forming processing on two ultrasound images so as to generate two raw images. The second-stage image-developing processing module is connected to the first-stage image-developing processing module, and configured for performing envelope detection processing and compression processing on the two raw images so as to generate two developed ultrasound images. The registration module is connected to the first-stage image-developing processing module and the second-stage image-developing processing module, and configured for respectively obtaining coordinate information of one or a plurality of feature points of the two raw images as one or plurality of initial values of an image registration procedure, and also configured for performing speckles-reducing processing on the two developed ultrasound images and using the two speckles-reduced ultrasound images to perform an image registration procedure.

According to the exemplary embodiment, the disclosure also provides an ultrasound image registration method. The ultrasound image registration method is suitable for registering two ultrasound images partially overlapped with each other and includes following steps: performing beam-forming processing on the two ultrasound images to generate two raw images; performing envelope detection processing and compression processing on the two raw images to generate two developed ultrasound images; respectively obtaining coordinate information of one or a plurality of feature points of the two raw images as one or multiple initial values of an image registration procedure; performing speckles-reducing processing on the two developed ultrasound images; and performing an image registration procedure by using the two speckles-reduced ultrasound images.

Several exemplary embodiments accompanied with figures are described in detail below to further describe the disclosure.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

FIG. 5A is a schematic flowchart of a feature-extracting processing procedure according to an exemplary embodiment of the disclosure.

FIG. 5B is a schematic flowchart of another feature-extracting processing procedure according to an exemplary embodiment of the disclosure.

DETAILED DESCRIPTION OF DISCLOSED EMBODIMENTS

Figure 1:
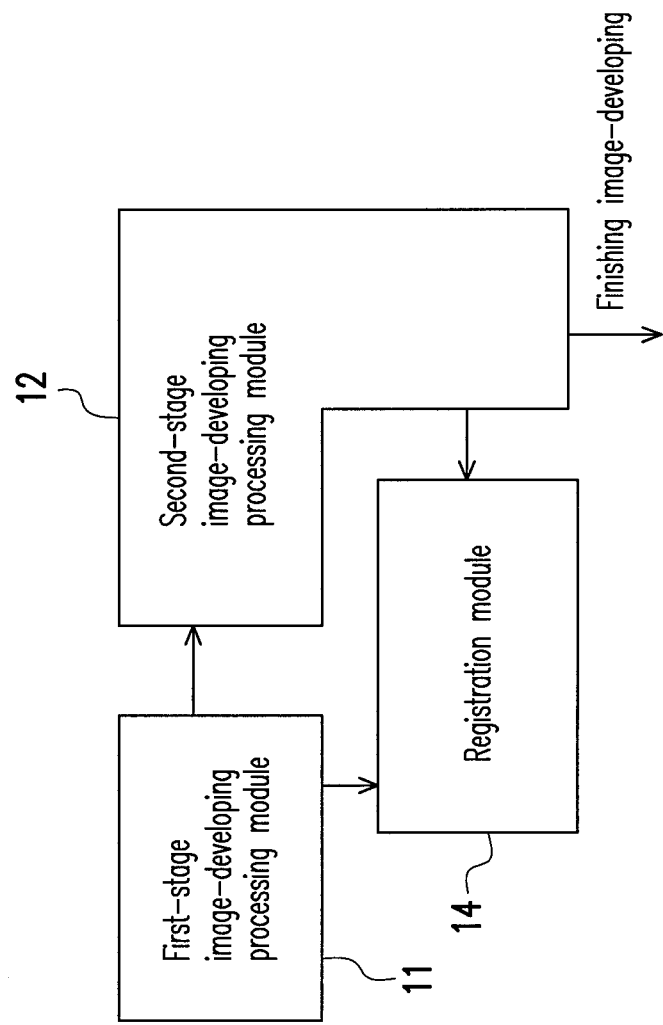
FIG. 1 is a functional block diagram of an ultrasound image registration apparatus according to an exemplary embodiment of the disclosure.

Below, exemplary embodiments will be described in detail with reference to accompanying drawings so as to be easily realized by a person having ordinary knowledge in the art. The inventive concept can be embodied in various forms without being limited to the exemplary embodiments set forth herein. Descriptions of well-known parts are omitted for clarity, and like reference numerals refer to like elements throughout The disclosure provides an ultrasound image registration apparatus and a method thereof. The disclosure is mainly to enhance the accuracy of registering images by adding a preprocessing technique into a current image registration method in developing the image fusion technique of ultrasound images, which needs to deal with the characteristic of traditional B-mode ultrasound image. In order to solve the conventional problem that speckles in an ultrasound image make it difficult for the step of optimization processing in an image registration processing architecture to achieve global optima, instead, only local optima can be found, the disclosure provides two processing procedures.

A first processing procedure is to decompose an image signal with feature point values by decomposing the feature points in the ultrasound image signal. For example, the feature points can be, for example, different bandwidth characteristic, so that an empirical modal decomposition (EMD) method can be used to decompose out a high-frequency signal, followed by removing the high-frequency signal to reach an image smoothing effect, and meanwhile, the negative impact of the speckles on the optimization operation processing can be reduced.

The second processing procedure is to select an initial point in an optimization process, and once the initial point is within a good range by selection, the global optima can be obtained. In this regard, the disclosure provides the coordinate information of the feature points, which are the feature points of the images coming from different sources in the ultrasound image registration processing course by extracting out the feature points in the ultrasound images (for example, spots with extreme bright-level and coordinate information for recognizing the above-mentioned high-brightness level spots). In particular, the vectors of the relative positions of the feature points of the images coming from different sources can be used as the initial values for the optimization process procedure in the image registration architecture.

The ultrasound image registration method of the disclosure is able to extract the information related to the feature points from an early step in the image-developing operation so that more completed information can be easily obtained. For example, a ratio of brightness to darkness of the ultrasound image without a log compression processing operation is quite large. However, if the bright area of the ultrasound image is cut off prior to the compression processing, a more accurate dynamic range can be obtained. In this way, the negative impact of the noise on the ultrasound image registration processing can be reduced.

To be illustrated more clearly, the ultrasound image registration method proposed in the present disclosure immediately performs a feature-extracting operation on the obtained raw ultrasound images straight after beam-forming processing but prior to envelope detection processing and compression processing. Furthermore, the proposed ultrasound image registration method also performs recognizing processing respectively on the feature point objects of the two raw ultrasound images and detects the relative coordinates of the feature point objects to serve as the initial values for the optimization operation of the ultrasound image registration process. In this way, the disclosure can reduce the number of execution loops required by the image registration process, reduce the required amount of computation, and increase the accuracy of image registration. In addition, prior to the image registration processing, an empirical modal decomposition (EMD) method is used to process the developed ultrasound images for reducing the negative impact of the speckles (noise) on the correlation between the two ultrasound images. The major technical feature of the provided ultrasound image registration method lies in that the feature points are extracted after the beam-forming processing in the ultrasound image-developing operation flow, and the feature points are used to serve as the initial values in the image registration operation. The aforementioned technical feature is obviously different from the conventional art, and can improve the operation accuracy in the image registration proceeding of the ultrasound B-mode image and reduce the required amount of computation.

The basic architecture of an ultrasound image registration apparatus provided by the disclosure is illustrated in FIG. 1. FIG. 1 is a functional block diagram of an ultrasound image registration apparatus according to an exemplary embodiment of the disclosure. Referring to FIG. 1, according to the exemplary embodiment, the ultrasound image registration apparatus 10 is suitable for registering two ultrasound images partially overlapped with each other, and comprises a first-stage image-developing processing module 11, a second-stage image-developing processing module 12 and a registration module 14.

In the present embodiment, the first-stage image-developing processing module 11 performs ultrasound image scannings twice on an object which requires ultrasound scanning so as to generate two ultrasound images. When a tester or medical service personnel performs the ultrasound image scanning, the ultrasound images generated by two consequently-performed operations of scanning would have overlapped image portions in the two ultrasound images due to moving the ultrasound probe. The ultrasound image registration apparatus 10 is employed to register the two ultrasound images.

The first-stage image-developing processing module 11 further performs the beam-forming processing on the two ultrasound images to generate two raw images. It can be briefly described that since the ultrasound signal to be detected is ultrasound echo signals travelling on multiple paths, so that the beam-forming processing is required to reduce the time-lags between ultrasound echo signals. As a result, the received ultrasound signals can be corresponding to same ultrasound detection signal by adjustment.

The second-stage image-developing processing module 12 is connected to the first-stage image-developing processing module 11, and configured for performing the envelope detection processing and the compression processing (or log compression processing) on the two raw images to generate two developed ultrasound images. In a brief description, the envelope detection processing removes the high-frequency carrier signal of the raw images, while the compression processing generates a compressed ultrasound image. The second-stage image-developing processing module 12 can directly output the compressed ultrasound images as the developed ultrasound images after "finishing the image-developing operation".

The registration module 14 is connected to the first-stage image-developing processing module 11 and the second-stage image-developing processing module 12, and configured for respectively obtaining coordinate information of one or a plurality of feature points of the two raw images and using the information as one or a plurality of initial values in an image registration procedure, performing speckles-reducing processing on the two developed ultrasound images and using the two speckles-reduced ultrasound images to perform the aforementioned image registration procedure. The registration module 14 can, in another way, directly perform the aforementioned image registration procedure on the two developed ultrasound images with reduced speckles.

Figure 2:
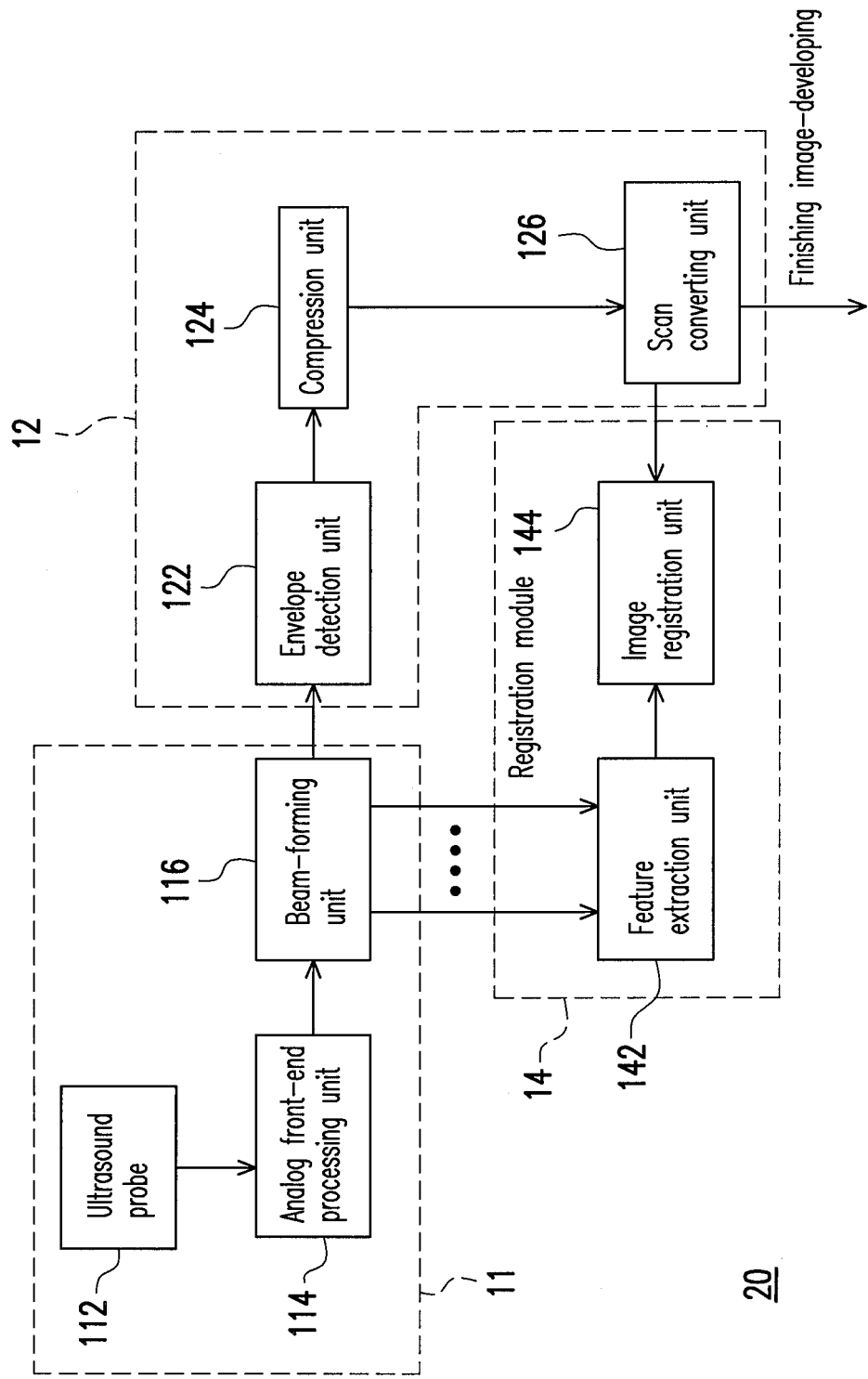
FIG. 2 is a functional block diagram of another ultrasound image registration apparatus according to an exemplary embodiment of the disclosure.

FIG. 2 is a functional block diagram of another ultrasound image registration apparatus according to an exemplary embodiment of the disclosure. The ultrasound image registration apparatus 20 described as follows is helpful to more clearly understand the details of the aforementioned ultrasound image registration apparatus 10. Referring to FIG. 2, the ultrasound image registration apparatus 20 comprises a first-stage image-developing processing module 11, a second-stage image-developing processing module 12 and a registration module 14. In the embodiment, the registration module 14 can be implemented with hardware, which is not intended to limit the present disclosure.

The first-stage image-developing processing module 11 comprises an ultrasound probe 112, an analog front-end processing unit 114 and a beam-forming unit 116. The second-stage image-developing processing module 12 comprises an envelope detection unit 122, a compression unit 124 and a scan converting unit 126. Both the first-stage image-developing processing module 11 and the second-stage image-developing processing module 12 are necessary components for performing the ultrasound image registration processing in current ultrasound image processing technology. In addition, the disclosure further employs an additional registration module 14 onto the current ultrasound image processing technique architecture, and the registration module 14 mainly comprises two operation units: a feature extraction unit 142 and an image registration unit 144.

The input data source of the feature extraction unit 142 is the output signal generated by the beam-forming processing of the first-stage image-developing processing module 11. The feature extraction unit 142 extracts an appropriate feature value data from the processable raw data (image) prior to the envelope detection processing and the log compression processing. For example, the feature value data can be coordinate information of high-brightness level areas or high density areas, which are not intended to limit the present disclosure. In fact the present disclosure can use other kinds of image feature value data.

For example, the feature extraction unit 142 mainly comprises two small function units. The first function unit is a high-brightness level segmentation module configured for cutting off the high-brightness level areas in the raw ultrasound images. The second function unit can be a circle detection module, which takes circles as units to respectively calculate the circle origin coordinate and the circle radius of each circle within each of the high-brightness level areas generated after segmenting the raw images and cutting out the aforementioned high-brightness areas by the first function unit. The second function unit further outputs the coordinate information to the image registration unit 144 as the initial values of the image registration procedure.

On the other hand, the feature extraction unit 142 is connected to the first-stage image-developing processing module 11, and configured for performing feature-extracting processing respectively on the two received raw images so as to respectively obtain the coordinate information of one or a plurality of feature points in the raw images, and then take the coordinate information as one or a plurality of initial values for an image registration procedure of the image registration unit 144. In this way, the embodiment can assist the image registration procedure in finding out the global optima. It should be noted that the numbers of the extracted feature points on the two raw images must be identical so as to realize the following image registration.

The image registration unit 144 is connected to the feature extraction unit 142 and the second-stage image-developing processing module 12, and configured for performing the speckles-reducing processing on the two developed ultrasound images generated by the second-stage image-developing processing module 12 and using one or a plurality of initial values obtained by the feature extraction unit 142 to perform the aforementioned image registration procedure on the two developed ultrasound images.

Figure 3:
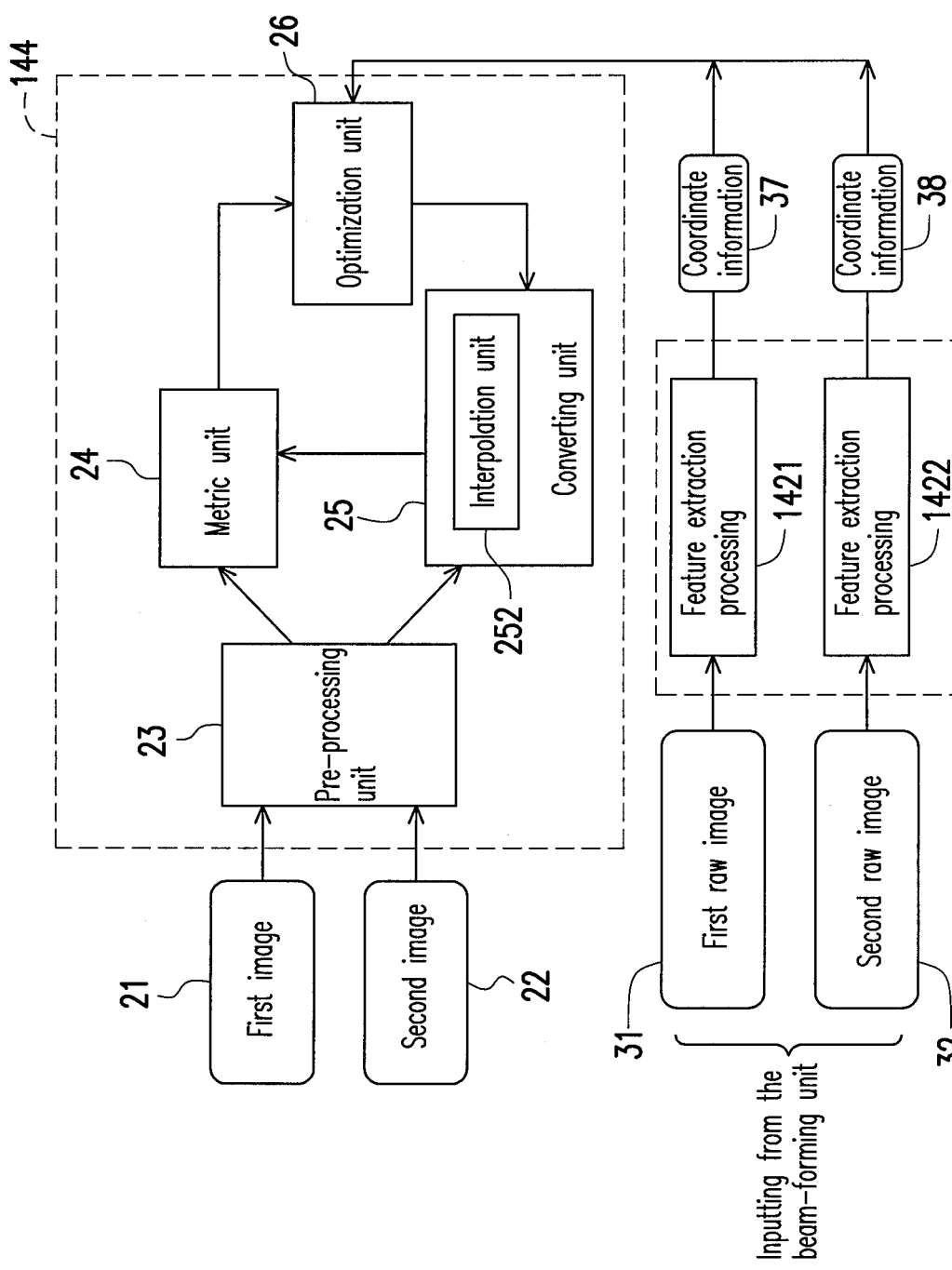
FIG. 3 is a functional block diagram of a registration module according to an exemplary embodiment of the disclosure.

The principal architecture of the image registration unit 144 is illustrated in FIG. 3. FIG. 3 is a functional block diagram of a registration module 14 according to an exemplary embodiment of the disclosure. Referring to FIG. 3, the image registration unit 144 comprises a pre-processing unit 23, a metric (i.e., similarity extent estimation) unit 24, a converting unit 25 and an optimization unit 26. The pre-processing unit 23 has at least two input images, where one input image is a fixed image (for example, a first image 21 shown in FIG. 3) and another one input image is a movable image (for example, a second image 22 shown in FIG. 3). The pre-processing unit 23 performs the speckles-reducing processing respectively on the fixed image and the movable image, and then outputs the speckles-reduced images respectively to the metric unit 24 and the converting unit 25.

The pre-processing unit 23 can comprise an EMD processing unit (not shown) and the aforementioned speckles-reducing processing is, for example, two-dimensional EMD processing. For example, the two images input to the pre-processing unit 23 can be input to an EMD processing unit (not shown) of the image registration unit 144, where the EMD processing unit performs the two-dimensional EMD processing on the input images to generate residue images. Furthermore, the EMD processing unit can selectively feed back the residue images for one time or for a plurality of times so as to restart the two-dimensional EMD processing in one cycle or in multiple cycles, and optionally to take the residue images generated in the final circle as the output values. In some embodiments, in order to achieve balance between the processing duration and the accuracy of the image registration, the residue images generated by the two-dimensional EMD processing at the second time can be selectively output to the converting unit 25 as the input values for converting processing.

After the two-dimensional EMD processing of the movable image, the image is input to the converting unit 25 of the image registration unit 144, where the converting unit 25 performs a converting operation (or the converting processing) on one of the two images (or one convertible image) provided by the pre-processing unit 23. The converting operation can comprise a translation operation, a rotation operation, a zoom operation or a nonlinear deformation operation on the images. After that, the operation result is sent to an interpolation unit 252 for interpolating and complementing the blank pixels caused by the converting operation. However, the interpolation unit 252 is not a necessary unit. The metric unit 24 performs a metric operation on the converted image and the fixed image (or can be called as an unconvertible image). The metric unit 24 would decide (or determine) the metric value between the two images. The common metric comparison operation is sum of absolute differences or mutual information, which are not intended to limit the present disclosure. The metric unit 24 outputs the metric value to the optimization unit 26 where it is determined (selected) how to adjust the parameter of the converting unit 25 mainly through the change of the metric value of the two images so as to find out the global optima of the image registration processing flow.

In other embodiments, the registration module 14 can be a functional module implemented with software. In this regard, the ultrasound image registration apparatus 20 can further comprise a processor module (not shown) and a memory module (not shown). The memory module comprises program, software, firmware, instruction or code section of the registration module 14. After the processor module performs the aforementioned program, the functions of all the components of the registration module 14 are realized. That is to say, the processor module performs the program, software, firmware, instruction or code sections in the memory module respectively corresponding to the feature extraction unit 142 and the image registration unit 144, the functions related to the feature extraction unit 142 and the image registration unit 144 are implemented. After the components and the operating principle of the registration module 14 are illustrated, the components of the first-stage image-developing processing module 11 and the second-stage image-developing processing module 12 are described as follows.

Referring to FIG. 2 again, the first-stage image-developing processing module 11 comprises an ultrasound probe 112, an analog front-end processing unit 114 and a beam-forming unit 116. The ultrasound probe 112 is configured for obtaining two ultrasound images. The analog front-end processing unit 114 is connected to the ultrasound probe 112, and configured for converting the two ultrasound images into two digital ultrasound images. The beam-forming unit 116 is connected to the feature extraction unit 142 and the second-stage image-developing processing module 12, and configured for performing the beam-forming processing respectively on the two converted digital ultrasound images so as to generate two raw images (or raw ultrasound images). Since the two raw images have not been processed with the envelope detection processing and the compression processing, so that the two raw images still keep more feature value objects (for example, high-frequency signal, high density area or high-brightness level area) and more accurate dynamic range.

Referring to FIG. 2, the second-stage image-developing processing module 12 comprises an envelope detection unit 122, a compression unit 124 and a scan converting unit 126. The envelope detection unit 122 is connected to the beam-forming unit 116 of the first-stage image-developing processing module 11, and configured for performing the envelope detection processing on the two raw images so as to remove the high-frequency carrier signal of the two raw images and to obtain the profiles of the two raw images. The compression unit 124 is connected to the envelope detection unit 122, and configured for performing the compression processing on the two raw images without the high-frequency carrier signal and generating two developed ultrasound images. Since the relationship between the input dynamic range and the output dynamic range is an approximate log curve, the compression processing is also called log compression processing. The scan converting unit 126 is connected to the compression unit 124 and the image registration unit 144, and configured to output the two developed ultrasound images, and at the time, the "finishing the image-developing" is done. The image registration unit 144 simultaneously receives the two developed ultrasound images. Depending on the requirement of the actual displaying frames, the scan converting unit 126 can convert the coordinate system of the developed ultrasound images, for example, a polar coordinate system is converted into a Cartesian coordinate system.

Figure 4A:
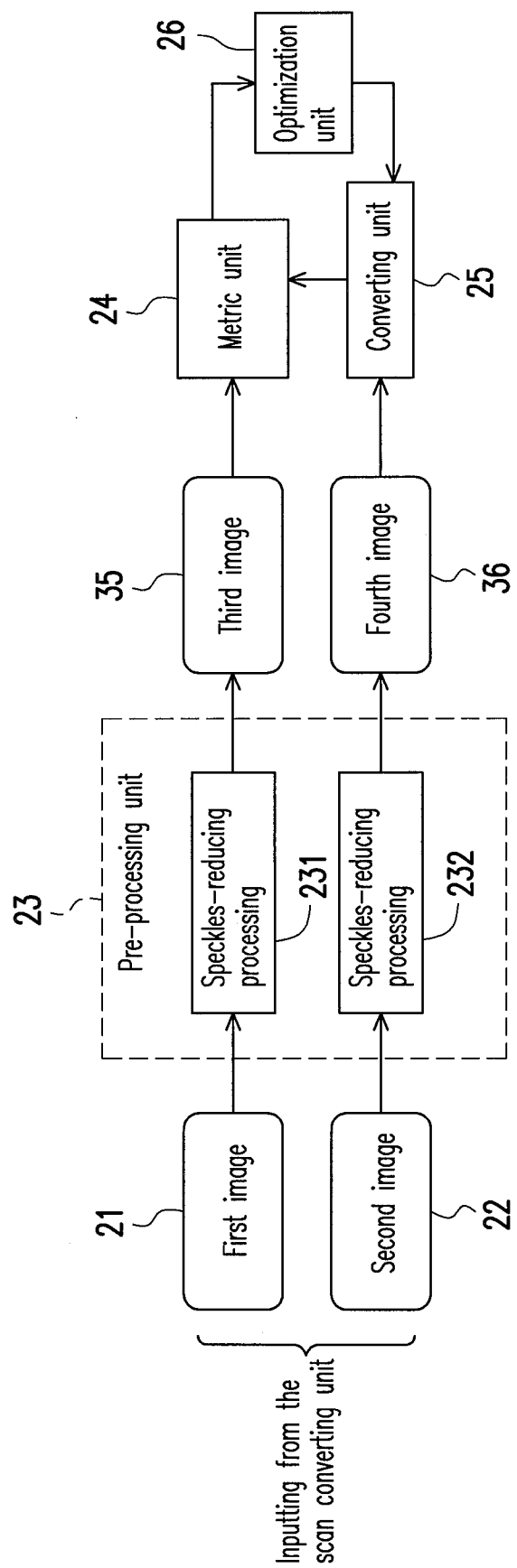
FIG. 4A is a partially functional block diagram of a registration module according to an exemplary embodiment of the disclosure.

FIG. 4A is a partially functional block diagram of a registration module according to an exemplary embodiment of the disclosure. Referring to FIGS. 3 and 4A, the image registration unit 144 in the registration module 14 comprises a pre-processing unit 23, a metric unit 24, a converting unit 25 and an optimization unit 26. The pre-processing unit 23 comprises an EMD processing unit (not shown), which is configured for performing the speckles-reducing processing respectively on the two developed ultrasound images so as to generate a convertible image and an unconvertible image (as also called a fixed image). For example, the pre-processing unit 23 receives a first image 21 and a second image 22 from the scan converting unit 126, in which the first image 21 can be an unconvertible image, while the second image 22 can be a convertible image. The convertible image is an image, which is able to be processed with a translation operation, a rotation operation, a zoom operation or a nonlinear deformation operation. The pre-processing unit 23 performs speckles-reducing processing 231 on the first image 21 so as to generate a third image 35, which is then output to the metric unit 24. Similarly, the pre-processing unit 23 performs another speckles-reducing processing 232 on the second image 22 so as to generate a fourth image 36, which is then output to the converting unit 25. In the present embodiment, as a matter of fact, the speckles-reducing processing 231 and the speckles-reducing processing 232 are performed by the EMD processing unit in the pre-processing unit 23.

The converting unit 25 is connected to the pre-processing unit 23, and configured for performing the converting processing on the convertible image and outputting a converted image. The converting processing comprises a translation operation, a rotation operation, a zoom operation or a nonlinear deformation operation. The metric unit 24 is connected to the pre-processing unit 23 and the converting unit 25, so that the pre-processing unit 23 receives the unconvertible image and the converting unit 25 receives the converted image and determines the metric value between the unconvertible image and the converted image. At the time, the metric unit 24 determines the metric value between the unconvertible image and the converted image, and the metric value is output to the optimization unit 26. The optimization unit 26 is connected to the metric unit 24 and the converting unit 25 and determines (or adjusts) one parameter or a plurality of parameters of the converting unit 25 according to the obtained metric value.

Figure 4B:
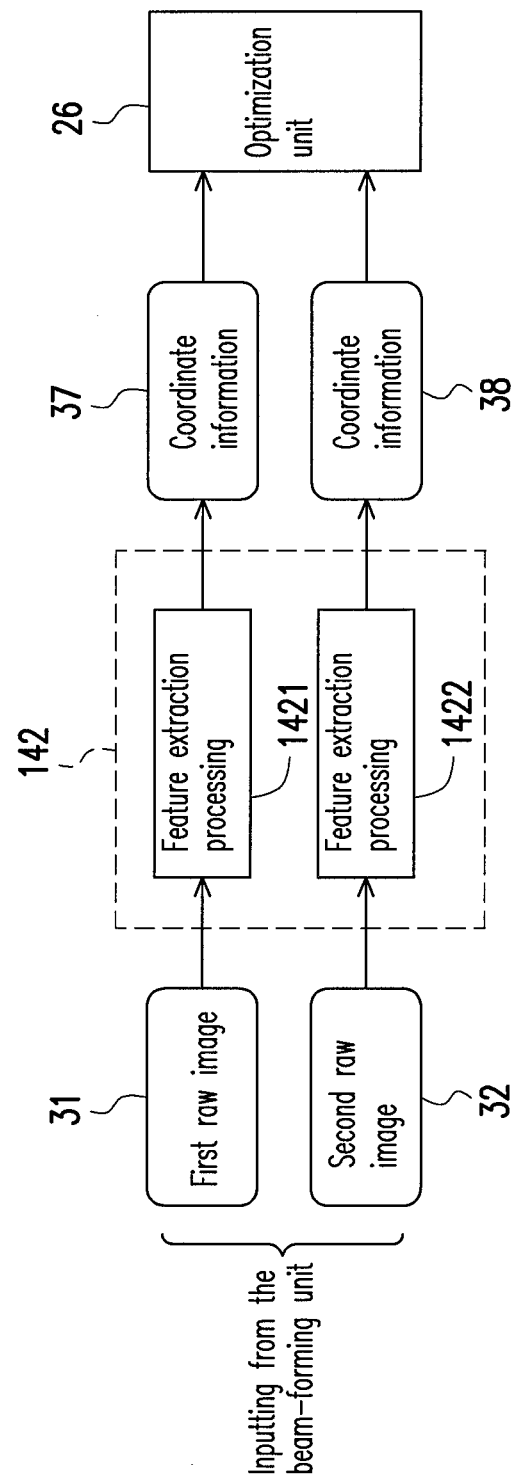
FIG. 4B is a partially functional block diagram of another registration module according to an exemplary embodiment of the disclosure.

FIG. 4B is a partially functional block diagram of another registration module according to an exemplary embodiment of the disclosure. Referring to FIGS. 3 and 4B, the feature extraction unit 142 in the registration module 14 performs the feature extraction processing (for example, feature extraction processing 1421 and feature extraction processing 1422) respectively on the two raw images (for example, a first image 31 and a second image 32), obtains the coordinate data corresponding to one or a plurality of feature values on the two raw images (for example, coordinate information 37 and 38) and outputs the coordinate data corresponding to the one feature value or a plurality of feature values to the optimization unit 26.

FIG. 5A is a schematic flowchart of a feature-extracting processing procedure according to an exemplary embodiment of the disclosure. The feature extraction unit 142 performs the feature extraction processing on a raw image 51 after undergoing the beam-forming processing (for example, one of the first raw image 31 and the second raw image 32), and the feature-extracting processing comprises high-frequency area segmentation processing respectively on one of the two raw images (step 52) so as to generate one feature point or a plurality of feature points. Then, the coordinates of the one feature point or a plurality of feature points are respectively detected (step 53), and the coordinate information 54 of the one feature point or a plurality of feature points are output. In addition, the method for detecting the coordinates of the one feature point or a plurality of feature points in the step 53 can be: drawing a circle respectively within each high-frequency area; taking an average value of the coordinate positions corresponding to the high-frequency feature points in the circle as the coordinate information corresponding to the high-frequency area.

FIG. 5B is a schematic flowchart of another feature-extracting processing procedure according to an exemplary embodiment of the disclosure. The feature extraction unit 142 performs the feature extraction processing on a raw image 56 after undergoing the beam-forming processing (for example, one of the first raw image 31 and the second raw image 32) and the feature extraction processing in the present embodiment comprises a high-brightness level area segmentation processing respectively on one of the two raw images (step 57) so as to generate one feature point or a plurality of feature points. Then, the coordinates of the one feature point or a plurality of feature points are respectively detected (step 58), and the coordinate information 59 of the one feature point or a plurality of feature points are output. In addition, the method for detecting the coordinates of the one feature point or a plurality of feature points in the step 58 can be: drawing a circle respectively within each high-brightness level area; taking the circle origin of each circle as the coordinate information corresponding to the high bright-level area. It should be noted that FIGS. 5A and 5B are merely exemplary embodiments, the present disclosure is not limited to the method of the feature extraction processing shown in FIGS. 5A and 5B. In fact, other feasible methods of feature extraction processing are allowed for the present disclosure.

Figure 6:
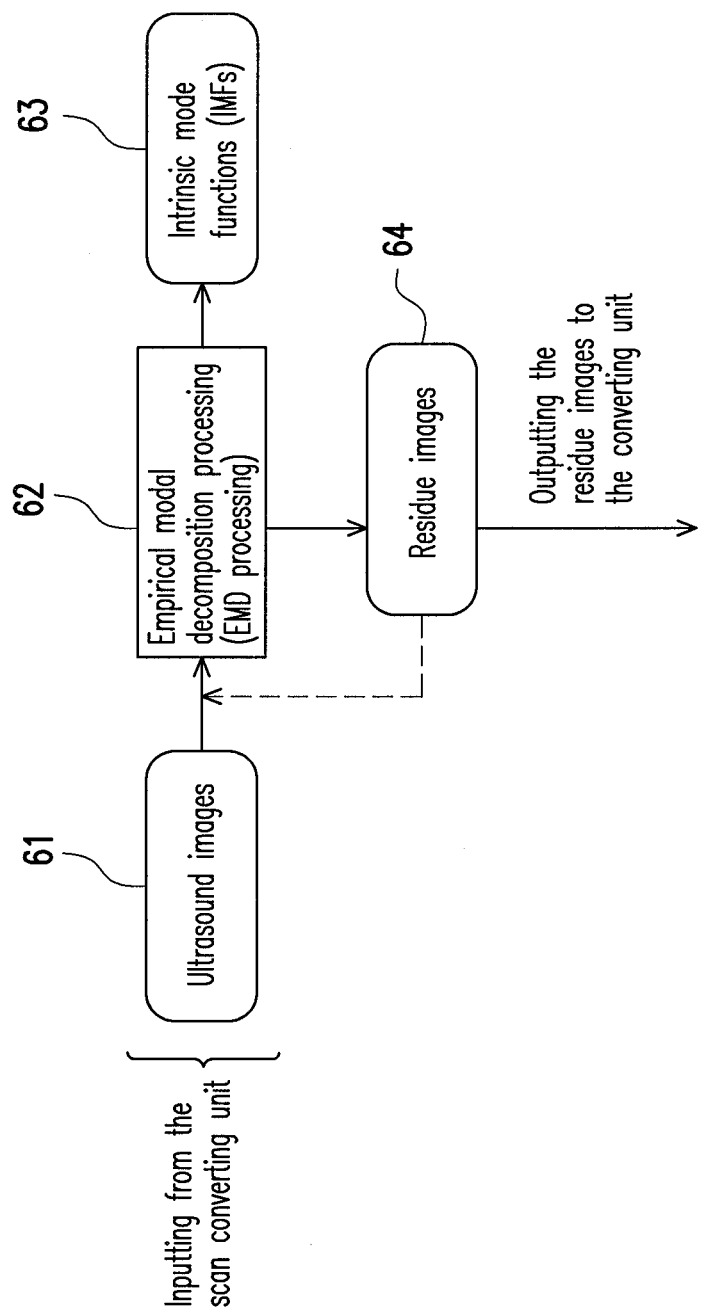
FIG. 6 is a schematic flowchart of a speckles-reducing processing procedure according to an exemplary embodiment of the disclosure.

FIG. 6 is a schematic flowchart of a speckles-reducing processing procedure according to an exemplary embodiment of the disclosure. Referring to FIGS. 2, 3 and 6, in the embodiment, the pre-processing unit 23 further performs the two-dimensional EMD processing respectively on two developed ultrasound images 61 input from the scan converting unit 126 (step 62) so as to generate multiple intrinsic modal functions 63 (IMFs 63) and one or a plurality of residue images 64. After the residue images 64 are fed back for one time or for more times to the two-dimensional EMD processing procedure, the same two-dimensional EMD processing is performed again. Then, the residue images 64 generated at the final time is output to the converting unit 25 of the image registration unit 144 as the input value of the converting unit 25. For example, in some embodiments, in order to achieve balance between the processing duration and the accuracy of the image registration, the residue images generated by the two-dimensional EMD processing at the second time can be selectively output to the converting unit 25 as the input values for the converting processing.

Figure 7:
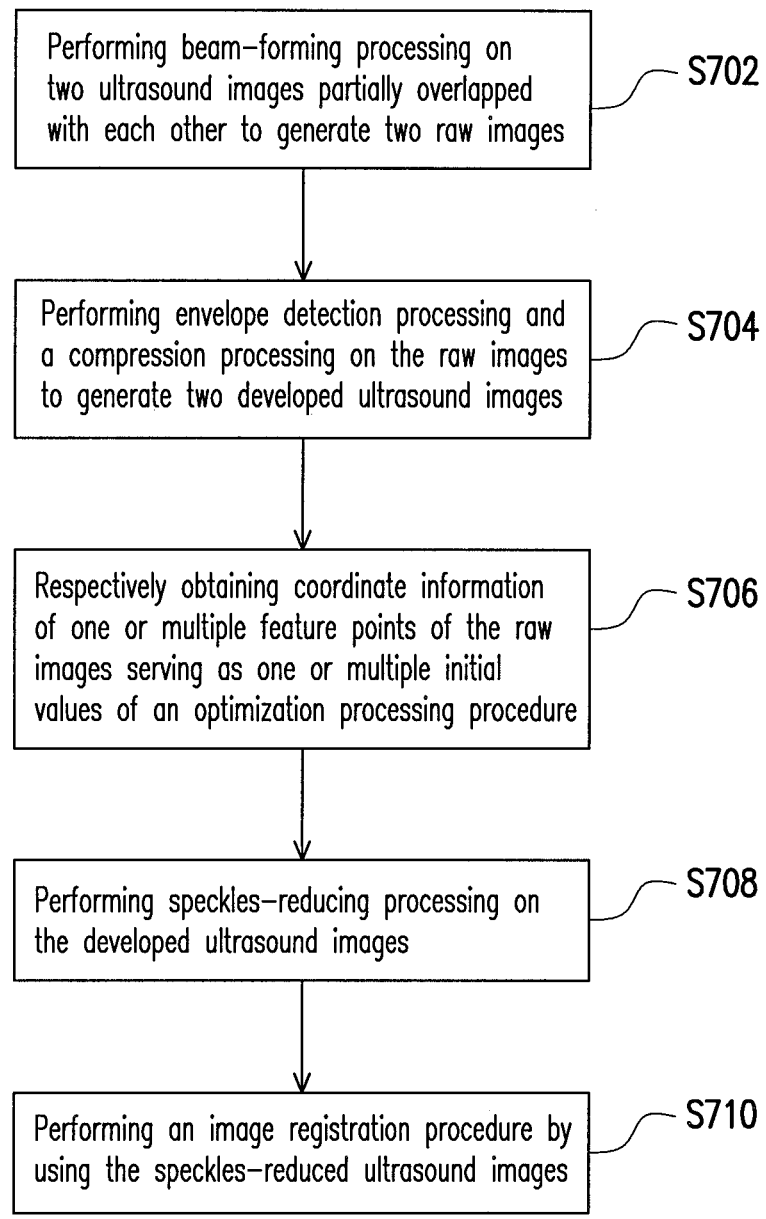
FIG. 7 is a schematic flowchart of an ultrasound image registration method according to an exemplary embodiment of the disclosure.

FIG. 7 is a schematic flowchart of an ultrasound image registration method according to an exemplary embodiment of the disclosure. In the present embodiment, the ultrasound image registration method is suitable for registering two ultrasound images partially overlapped with each other and comprises following steps: performing the beam-forming processing on two ultrasound images to generate two raw images (step S702); performing the envelope detection processing and the compression processing on the raw images to generate two developed ultrasound images (step S704); respectively obtaining coordinate information of one feature point or a plurality of feature points of the two raw images as one initial value or a plurality of initial values of an optimization processing procedure (step S706); performing the speckles-reducing processing on the two developed ultrasound images (step S708); and performing an image registration procedure by using the two speckles-reduced ultrasound images (step S710).

Figure 8:
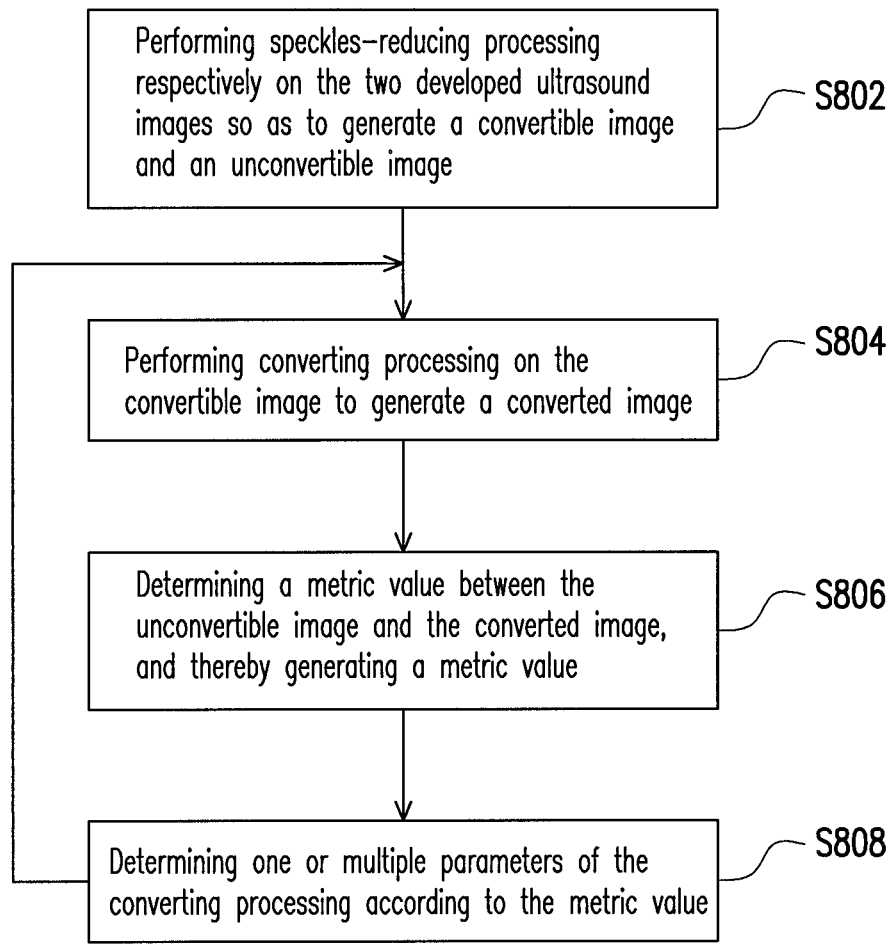
FIG. 8 is a schematic flowchart of an image registration procedure according to an exemplary embodiment of the disclosure.

FIG. 8 is a schematic flowchart of an image registration procedure according to an exemplary embodiment of the disclosure. The image registration procedure described as follows is helpful to more clearly illustrate the details of the aforementioned step S710. The image registration procedure comprises following steps: performing the speckles-reducing processing respectively on the two developed ultrasound images so as to generate a convertible image and an unconvertible image (step S802); performing the converting processing on the convertible image to generate a converted image (step S804); determining a metric extent between the unconvertible image and the converted image, and then generating the metric value (step S806); and determining one parameter or a plurality of parameters of the converting processing according to the metric value (step S808). The image registration procedure feeds back the parameter or the parameters to step S804 so that the converted image generated by step S804 is able to provide more similar results in the metric operation of step S806. Such a feedback flow can be stopped when the metric value obtained in step S806 is greater than a threshold value; or the aforementioned feedback flow can be stopped when a dissimilarity value estimated in the step S806 is less than another threshold value.

Figure 9:
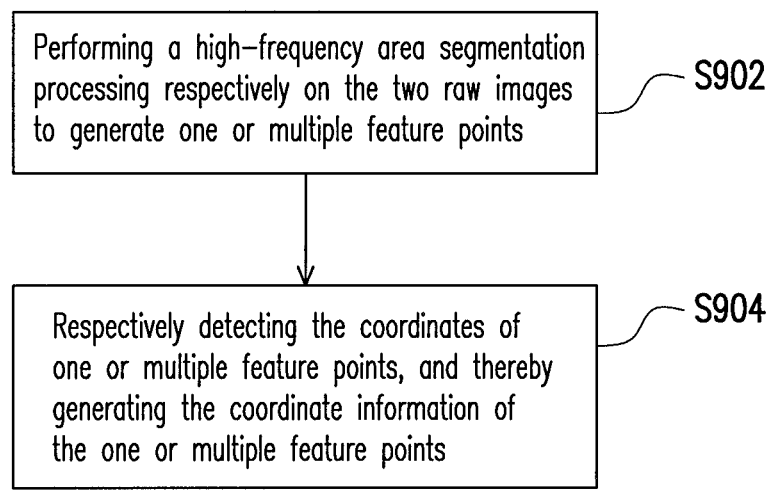
FIG. 9 is a schematic flowchart of a feature-extracting processing procedure according to an exemplary embodiment of the disclosure.

FIG. 9 is a schematic flowchart of a feature-extracting processing procedure according to an exemplary embodiment of the disclosure. The feature-extracting processing procedure comprises: performing high-frequency area segmentation processing respectively on the two raw images to generate one feature point or a plurality of feature points (step S902); and respectively detecting the coordinates of one feature point or a plurality of feature points and generating the coordinate information of the one feature point or a plurality of feature points (step S904).

Figure 10:
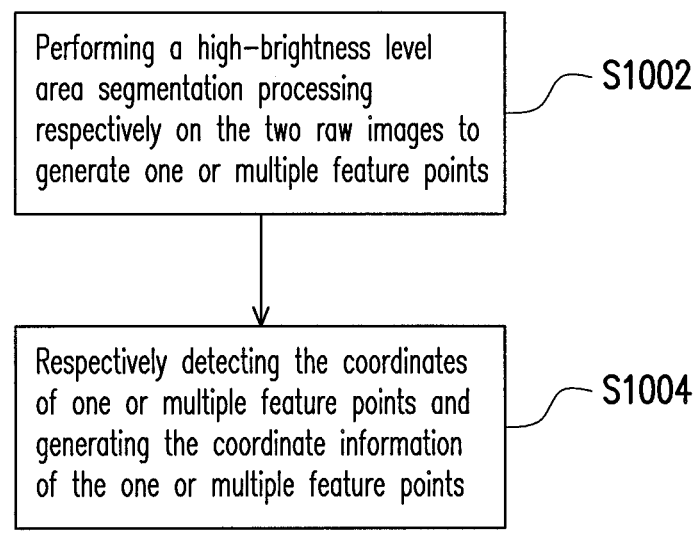
FIG. 10 is a schematic flowchart of another feature-extracting processing procedure according to an exemplary embodiment of the disclosure.

FIG. 10 is a schematic flowchart of another feature-extracting processing procedure according to an exemplary embodiment of the disclosure. The feature-extracting processing procedure comprises: performing high-brightness level area segmentation processing respectively on the two raw images to generate one feature point or a plurality of feature points (step S1002); and respectively detecting the coordinates of one feature point or a plurality of feature points, and then generating the coordinate information of the one feature point or a plurality of feature points (step S1004).

Figure 11:
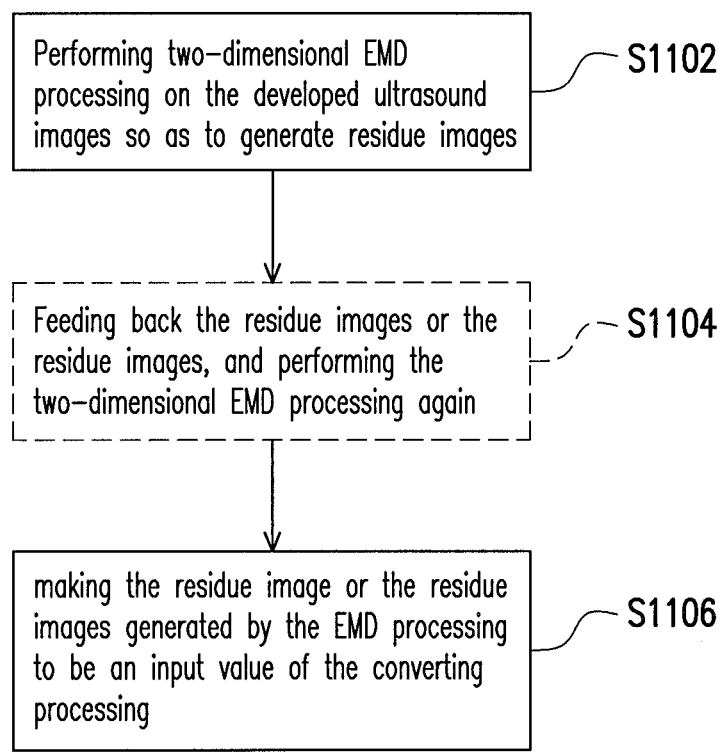
FIG. 11 is a schematic flowchart of a speckles-reducing processing procedure according to an exemplary embodiment of the disclosure.

FIG. 11 is a schematic flowchart of a speckles-reducing processing procedure according to an exemplary embodiment of the disclosure. The speckles-reducing processing procedure comprises: performing the two-dimensional EMD processing on the two developed ultrasound images so as to generate one residue image or a plurality of residue images (step S1102); feeding back the residue image or the residue images and performing the same two-dimensional EMD processing again (step S1104); and then outputting the one residue image or multiple residue images generated by the two-dimensional EMD processing serving as an input value for the converting processing to the converting processing procedure (step S1106). The speckles-reducing processing procedure can feed back, in an iteration fashion, the generated one residue image or a plurality of residue images so as to restart the two-dimensional EMD processing. After performing the two-dimensional EMD processing again by using the residue images generated through one time or multiple times of feedbacks, the residue images generated by the two-dimensional EMD processing at the final time is taken as the input values of the converting processing. In some embodiments, in order to achieve balance between the processing duration and the accuracy of the image registration, the residue images generated by the two-dimensional EMD processing at the second time can be selectively output to the converting processing procedure as the input values for the converting processing.

The disclosure is not limited to the aforementioned operation flow of FIG. 11. In other embodiments, the step S1104 is not a necessary step. In this regard, the speckles-reducing processing procedure provided by the disclosure can be modified that the step S1106 is directly performed after the step S1102. In other words, the residue images generated by just one time of the two-dimensional EMD processing without feeding back the residue images are output to the converting unit as the input values of the converting processing.

In summary, embodiments of the disclosure provide an ultrasound image registration apparatus and a method thereof. According to the embodiments, the raw ultrasound images are obtained immediately after the beam-forming processing but prior to the envelope detection processing and the compression processing so as to perform a feature-extracting operation, respectively obtain the feature value objects of the two raw ultrasound images for recognizing and detect the relative coordinates of the feature value objects and make the detected result to be the initial values for the optimization operation of the image registration procedure. In this way, the embodiments can reduce the number of execution loops required by the image registration proceeding, reduce the required amount of computation, and increase the accuracy of image registration. In addition, prior to the image registration proceeding, an EMD method is used to process the developed ultrasound images for reducing the negative impact of the speckles (noise) on the correlation between the two ultrasound images.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An ultrasound image registration apparatus, suitable for registering two ultrasound images partially overlapped with each other, the ultrasound image registration apparatus comprising:
    a first-stage image-developing processing module, configured for performing beam-forming processing on the ultrasound images so as to generate two raw images;
    a second-stage image-developing processing module, connected to the first-stage image-developing processing module, configured for performing envelope detection processing and compression processing on the raw images so as to generate two developed ultrasound images; and
    a registration module, connected to the first-stage image-developing processing module and the second-stage image-developing processing module, configured for respectively obtaining coordinate information of at least one feature point of the raw images as at least one initial value of an image registration procedure, and configured for performing speckles-reducing processing on the developed ultrasound images and using speckles-reduced ultrasound images to perform the image registration procedure, wherein the registration module comprises:
        a feature extraction unit, connected to the first-stage image-developing processing module, configured for respectively performing feature-extracting processing on the raw images to obtain coordinate information of at least one feature point of the raw images to be at least one initial value of the image registration procedure; and
        an image registration unit, connected to the feature extraction unit and the second-stage image-developing processing module, configured for performing the speckles-reducing processing on the developed ultrasound images and using the at least one initial value for performing the image registration procedure on the developed ultrasound images, and the image registration unit comprises:
            a pre-processing unit, performing the speckles-reducing processing respectively on the developed ultrasound images so as to generate a convertible image and an unconvertible image; and
            a converting unit, connected to the pre-processing unit, configured for performing converting processing on the convertible image and outputting a converted image, wherein the pre-processing unit further performs two-dimensional empirical modal decomposition processing on the developed ultrasound images to generate a residue image and outputs the residue image generated by the two-dimensional empirical modal decomposition processing to the converting unit
            a metric unit, connected to the pre-processing unit and the converting unit, configured for receiving the unconvertible image and the converted image, determining a metric value between the unconvertible image and the converted image, and outputting the metric value; and
            an optimization unit, connected to the metric unit and the converting unit, configured for determining at least one parameter of the converting unit according to the metric value.

2. The ultrasound image registration apparatus as claimed in claim 1, wherein the first-stage image-developing processing module comprises:
    an ultrasound probe, configured for obtaining the ultrasound images;
    an analog front-end processing unit, connected to the ultrasound probe, configured for converting the ultrasound images into two digital ultrasound images; and
    a beam-forming unit, connected to the feature extraction unit and the second-stage image-developing processing module, configured for performing the beam-forming processing on the digital ultrasound images so as to generate the raw images.

3. The ultrasound image registration apparatus as claimed in claim 1, wherein the second-stage image-developing processing module comprises:

an envelope detection unit, connected to the first-stage image-developing processing module, configured for performing the envelope detection processing on the raw images so as to remove high-frequency carrier signals of the raw images;

a compression unit, connected to the envelope detection unit, configured for performing the compression processing on the raw images whose high-frequency carrier signals of the raw images are removed, so as to generate the developed ultrasound images; and a scan converting unit, connected to the compression unit and the image registration unit, configured for outputting the developed ultrasound images.

4. The ultrasound image registration apparatus as claimed in claim 1, wherein the feature-extracting processing comprises:

performing high-frequency area segmentation processing respectively on the raw images to generate at least one feature point; and respectively detecting the coordinates of the at least one feature point and outputting the coordinate information of the at least one feature point.

5. The ultrasound image registration apparatus as claimed in claim 1, wherein the feature-extracting processing comprises:

performing high-brightness area level segmentation processing respectively on the raw images so as to generate the at least one feature point; and respectively detecting the coordinates of the at least one feature point and outputting the coordinate information of the at least one feature point.

6. The ultrasound image registration apparatus as claimed in claim 1, wherein the converting processing comprises a translation operation, a rotation operation, a zoom operation or a nonlinear deformation operation.

7. The ultrasound image registration apparatus as claimed in claim 1, wherein the optimization unit is further connected to the feature extraction unit and receives the at least one initial value output from the feature extraction unit to be the initial value of the image registration procedure.

8. The ultrasound image registration apparatus as claimed in claim 1, wherein the pre-processing unit further feeds back the residue image for at least one time, and performs the two-dimensional empirical modal decomposition processing again.

9. An ultrasound image registration method, suitable for registering two ultrasound images partially overlapped with each other, the ultrasound image registration method comprising:

performing beam-forming processing on the ultrasound images to generate two raw images;

performing envelope detection processing and compression processing on the raw ages to generate two developed ultrasound images;

respectively obtaining coordinate information of at least one feature point of the raw images to be at least one initial value of an image registration procedure;

performing speckles-reducing processing on the developed ultrasound images; and performing the image registration procedure by using speckles-reduced ultrasound images, wherein the image registration procedure comprises:

performing the speckles-reducing processing respectively on the developed ultrasound images so as to generate a convertible image and an unconvertible image, wherein the speckles-reducing processing comprises performing two-dimensional empirical modal decomposition processing on the developed ultrasound images to generate a residue image and using the residue image generated by the two-dimensional empirical modal decomposition processing to be an input value of the converting processing;

performing converting processing on the convertible image to generate a converted image;

determining a metric value between the unconvertible image and the converted image and generating the metric value; and determining at least one parameter of the converting processing according to the metric value.

10. The ultrasound image registration method as claimed in claim 9, wherein the step of respectively obtaining coordinate information of at least one feature point of the raw images comprises:

performing feature-extracting processing respectively on the raw images to obtain coordinate information of at least one feature point of the raw images to be at least one initial value of an image registration procedure.

11. The ultrasound image registration method as claimed in claim 10, wherein the feature-extracting processing comprises:

performing a high-frequency area segmentation processing respectively on the raw images to generate at least one feature point; and respectively detecting the coordinates of the at least one feature point and generating the coordinate information of the at least one feature point.

12. The ultrasound image registration method as claimed in claim 10, wherein the feature-extracting processing comprises:

performing a high-brightness level area segmentation processing respectively on the raw images to generate at least one feature point; and respectively detecting the coordinates of the at least one feature point and generating the coordinate information of the at least one feature point.

13. The ultrasound image registration method as claimed in claim 9, wherein the step of performing the image registration procedure by using the speckles-reduced ultrasound images comprises:

performing the image registration procedure on the developed ultrasound images by using at least one initial value.

14. The ultrasound image registration method as claimed in claim 9, wherein the step of performing the beam-forming processing on the ultrasound images comprises:

obtaining the ultrasound images;

converting the ultrasound images into two digital ultrasound images; and performing the beam-forming processing on the digital ultrasound images to generate the raw images.

15. The ultrasound image registration method as claimed in claim 9, wherein the step of performing the envelope detection processing and the compression processing on the raw images comprises:

performing the envelope detection processing on the raw images so as to remove the high-frequency carrier signals of the raw images; and performing the compression processing on the raw images whose high-frequency carrier signals are removed, so as to generate the developed ultrasound images.

16. The ultrasound image registration method as claimed in claim 9, wherein the converting processing comprises a translation operation, a rotation operation, a zoom operation or a nonlinear deformation operation.

17. The ultrasound image registration method as claimed in claim 9, wherein the speckles-reducing processing further comprises:

feeding back the residue image for at least one time and performing the two-dimensional empirical modal decomposition processing again.

\* \* \* \* \*